(12) United States Patent
Nihei

(10) Patent No.: US 12,428,072 B2
(45) Date of Patent: Sep. 30, 2025

(54) VEHICLE LOWER STRUCTURE

(71) Applicant: HONDA MOTOR CO., LTD., Tokyo (JP)

(72) Inventor: Hidefumi Nihei, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 271 days.

(21) Appl. No.: 18/173,970

(22) Filed: Feb. 24, 2023

(65) Prior Publication Data

US 2023/0278641 A1    Sep. 7, 2023

(30) Foreign Application Priority Data

Mar. 2, 2022  (JP) ................ 2022-031375

(51) Int. Cl.
*B62D 25/20* (2006.01)
*F01N 13/18* (2010.01)

(52) U.S. Cl.
CPC ......... *B62D 25/20* (2013.01); *F01N 13/1805* (2013.01)

(58) Field of Classification Search
CPC ....... F01N 13/1805; F01N 1/00; B62D 25/20; B60R 13/0876
USPC ................................. 181/175–296
See application file for complete search history.

(56) References Cited

U.S. PATENT DOCUMENTS

| | | | | |
|---|---|---|---|---|
| 3,471,265 A | * | 10/1969 | Baust | F01N 3/34 60/299 |
| 6,668,972 B2 | * | 12/2003 | Huff | F01N 1/10 181/282 |
| 7,025,412 B2 | * | 4/2006 | Nakamura | B62D 25/2036 296/193.07 |
| 7,104,595 B2 | * | 9/2006 | Kamura | B62D 21/10 296/184.1 |
| 7,134,710 B2 | * | 11/2006 | Kamura | B62D 21/10 296/184.1 |
| 8,291,698 B2 | * | 10/2012 | Hikami | F01N 13/102 181/204 |
| 11,091,209 B2 | * | 8/2021 | Nakagawa | B62D 35/02 |
| 2002/0079162 A1 | | 6/2002 | Huff et al. | |
| 2003/0062743 A1 | | 4/2003 | Fujii et al. | |
| 2005/0046236 A1 | | 3/2005 | Nakamura et al. | |

FOREIGN PATENT DOCUMENTS

| | | |
|---|---|---|
| CN | 1401531 A | 3/2003 |
| CN | 1590195 A | 3/2005 |
| CN | 1682015 A | 10/2005 |

(Continued)

OTHER PUBLICATIONS

Chinese Office Action received in corresponding Chinese application No. 202310176439.9 dated Jul. 19, 2025 with English translation (12 pages).

*Primary Examiner* — Forrest M Phillips
*Assistant Examiner* — Joseph James Peter Illicete
(74) *Attorney, Agent, or Firm* — Rankin, Hill & Clark LLP

(57) ABSTRACT

A lower structure of a vehicle is configured to include a floor panel, an exhaust member arranged below the floor panel, and a cover member provided between the floor panel and the exhaust member and attached to the floor panel. The cover member includes front fixation portions provided on the front side and fixed to the floor panel and a bead portion arranged behind the front fixation portions and extending in a vehicle width direction.

4 Claims, 5 Drawing Sheets

(56) References Cited

FOREIGN PATENT DOCUMENTS

| | | |
|---|---|---|
| CN | 205243608 U | 5/2016 |
| CN | 205503246 U | 8/2016 |
| CN | 205591996 U | 9/2016 |
| CN | 207195020 U | 4/2018 |
| CN | 208138031 U | 11/2018 |
| JP | 6265250 B1 | 1/2018 |
| JP | 2018-083511 A | 5/2018 |

* cited by examiner

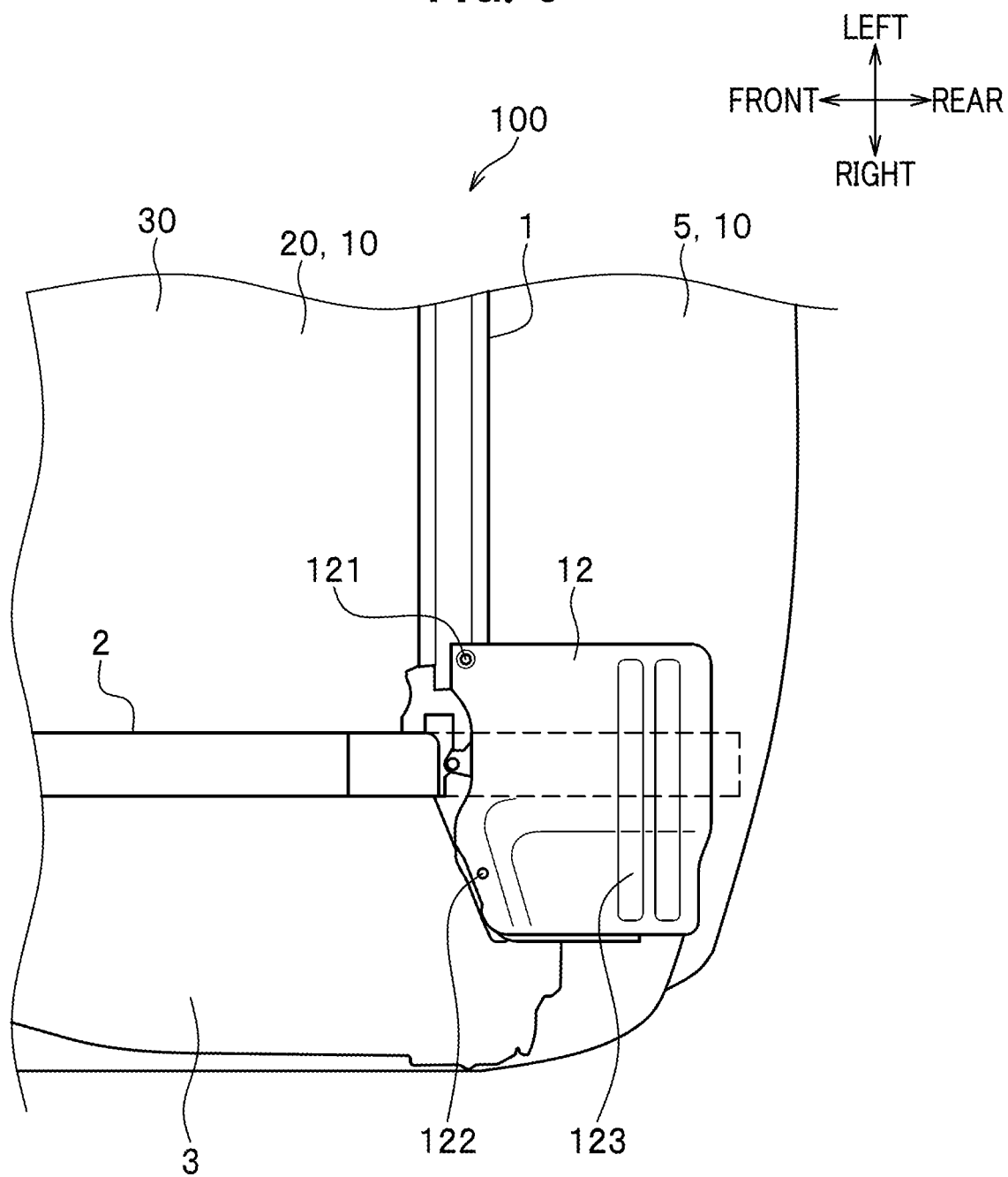

VEHICLE LOWER STRUCTURE

CROSS-REFERENCE TO RELATED APPLICATION

This application is based upon and claims priority from Japanese Patent Application No. 2022-031375, filed on Mar. 2, 2022, the entire contents of which are incorporated herein by reference.

BACKGROUND OF THE INVENTION

1. Field of the Invention

The present invention relates to a lower structure of a vehicle.

2. Description of the Related Art

A vehicle has been conventionally provided with an exhaust member referred to as so-called muffler. The muffler reduces engine noise and suppresses exhaust gas when an engine is run by using gasoline as a fuel.

As a technique relating to an attachment structure of a muffler, for example, JP2018-83511A discloses an attachment structure in which a sub-frame is provided with a noise absorbing material (cover member) along an upper surface of a suspension cross extending in the vehicle width direction, and the noise absorbing material includes a noise absorbing material main body and four attachment legs attached to the sub-frame (see JP2018-83511A).

SUMMARY OF THE INVENTION

As shown in JP2018-83511A, the noise absorbing material is attached to the sub-frame with the four attachment legs. When attachment portions for the four attachment legs cannot be secured in the sub-frame, a fixation bracket is attached to the sub-frame. Accordingly, the number of parts and attachment man-hours increase, and the cost increases.

Meanwhile, simply reducing the number of attachment portions when the attachment portions cannot be secured may reduce the supporting rigidity of the noise absorbing material and cause the noise absorbing material to vibrate.

The present invention has been made in view of the aforementioned circumstances, and an object is to suppress vibration of a cover member while reducing the number of parts and attachment man-hours.

A lower structure of a vehicle to achieve the aforementioned object includes: a vehicle body floor; an exhaust member arranged below the vehicle body floor; and a cover member provided between the vehicle body floor and the exhaust member and attached to the vehicle body floor, in which the cover member includes a front fixation portion provided on the front side and fixed to the vehicle body floor, and a bead portion arranged behind the front fixation portion and extending in a vehicle width direction.

The present invention can suppress vibration of a cover member while reducing the number of parts and attachment man-hours.

BRIEF DESCRIPTION OF THE DRAWINGS

FIG. 5 is an explanatory view showing a state where the lower structure of the vehicle in FIG. 3 includes no rear fixation portion, as a modified example.

DETAILED DESCRIPTION OF THE EMBODIMENTS

Figure 1:
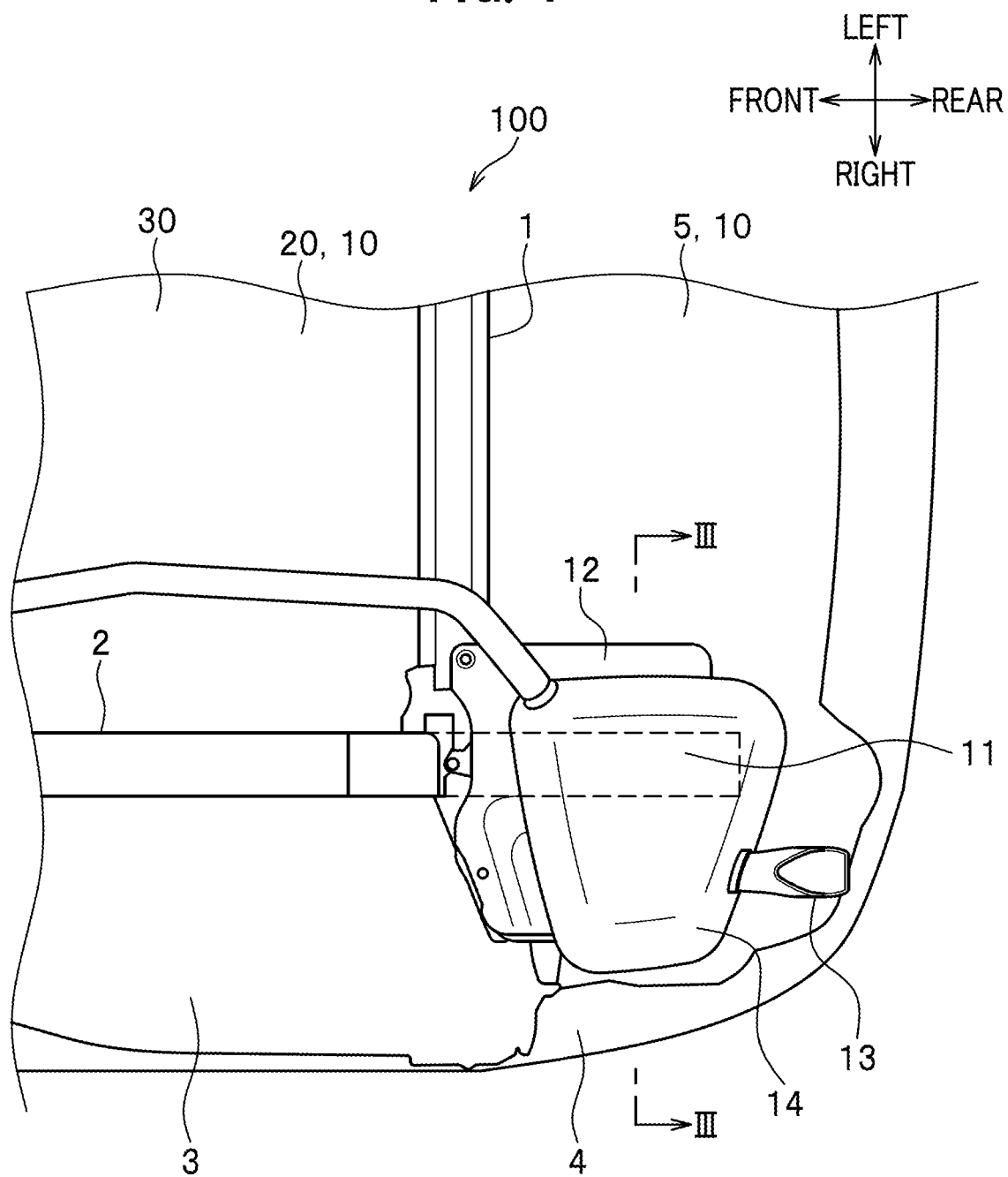
FIG. 1 is a bottom view in which a lower structure of a vehicle according to the present embodiment is viewed upward from below.

An embodiment of the present embodiment is described below in detail. Note that the embodiment described below is an example for achieving the present invention. Appropriate modifications and changes should be made depending on various conditions and a configuration of an apparatus to which the present invention is applied, and the present invention is not limited to the following embodiment. Moreover, the same configurations are denoted by the same reference signs in the drawings, and description thereof is omitted as appropriate.

Present Embodiment

[Schematic Configuration of Lower Structure of Vehicle]

Figure 2:
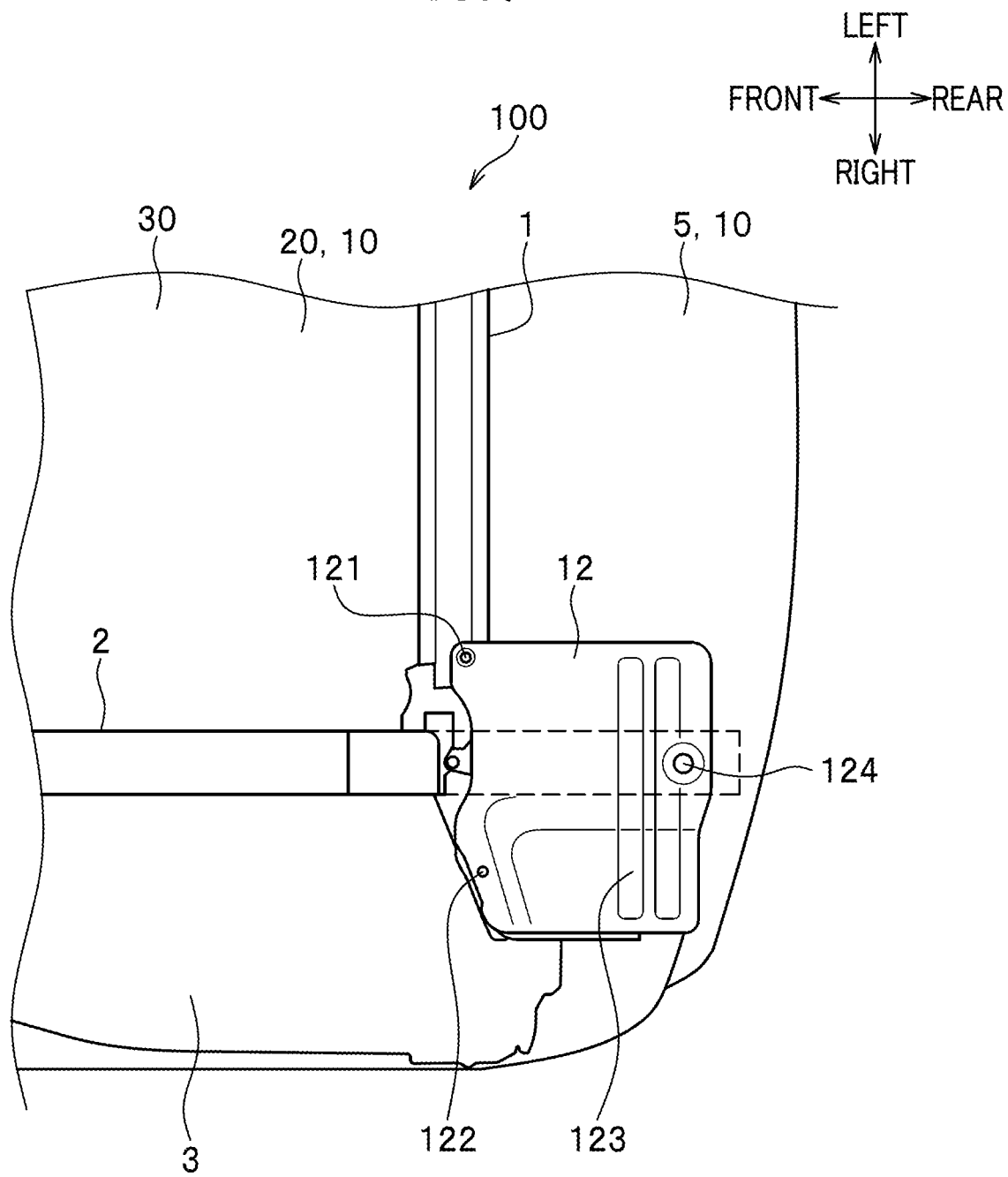
FIG. 2 is a bottom view showing a state where an exhaust member is removed from FIG. 1.
Figure 3:
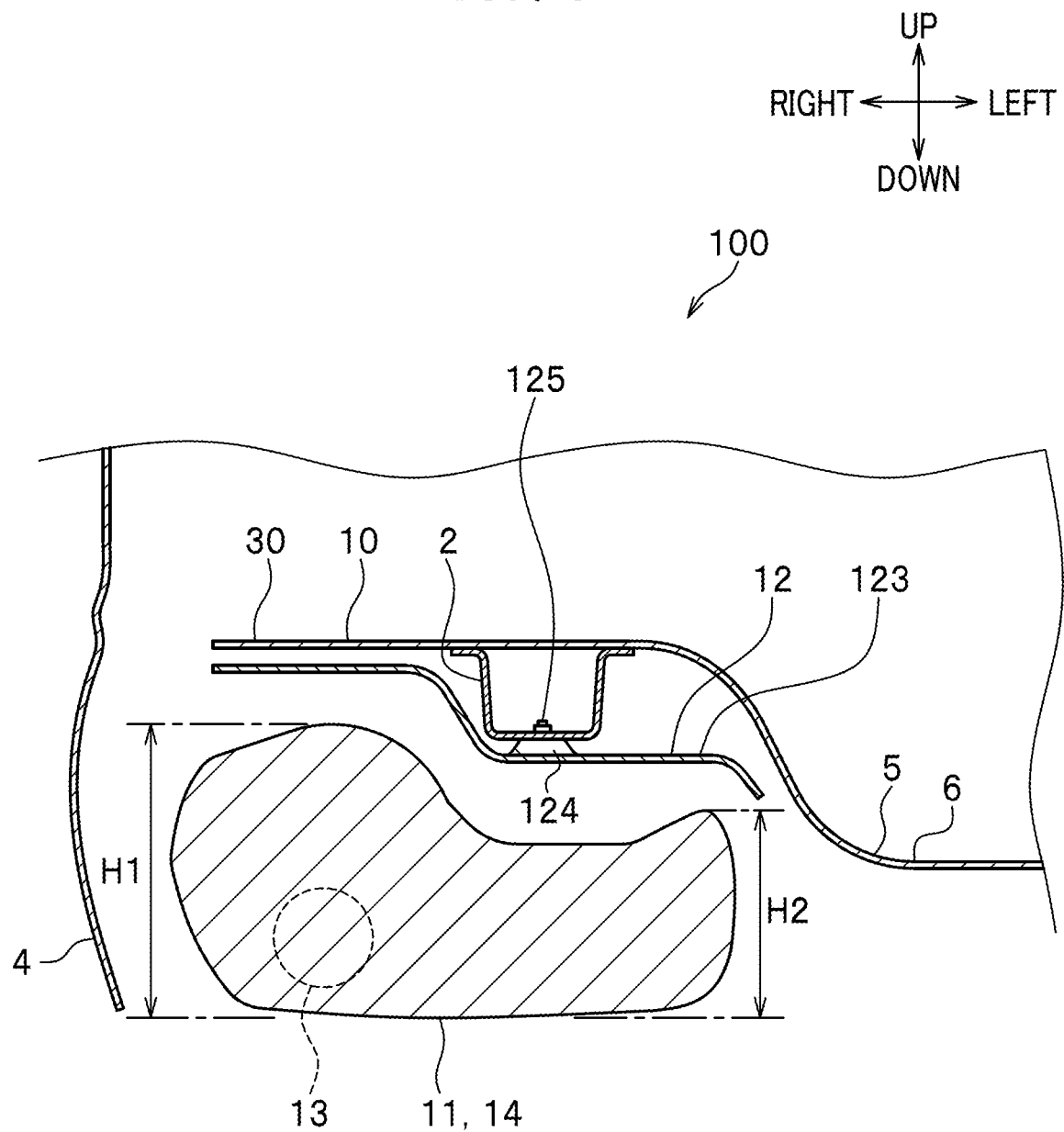
FIG. 3 is a cross-sectional view along the line shown in FIG. 1.

FIG. 1 is a bottom view in which a lower structure of a vehicle according to the present embodiment is viewed upward from below. FIG. 2 is a bottom view showing a state where an exhaust member is removed from FIG. 1. FIG. 3 is a cross-sectional view along the line shown in FIG. 1.

As shown in FIGS. 1 to 3, a lower structure 100 of a vehicle according to the present embodiment includes a vehicle body floor 30, an exhaust member 11 arranged below the vehicle body floor 30, and a cover member 12 provided between the vehicle body floor 30 and the exhaust member 11 and attached to the vehicle body floor 30.

The vehicle body floor 30 includes a floor panel 10 (see FIG. 3) forming a floor surface, paired left and right rear side members 2 (only the right rear side member 2 is shown) extending in a front-rear direction, a rear cross member 1 (see FIG. 1) extending in a vehicle width direction between the left and right rear side members 2, and wheel houses 3 (only the right wheel house 3 is shown) provided on the vehicle width direction outer sides of the respective rear side members 2. Note that a rear bumper face 4 is attached behind the wheel houses 3.

The floor panel 10 is formed of, for example, a metal plate shaped member. The floor panel 10 is formed of a middle floor panel 20 (see FIG. 1) arranged in front of the rear cross member 1 and a rear floor panel 5 arranged behind the rear cross member 1. The rear floor panel 5 includes a recess portion 6 for housing, in an intermediate portion in the vehicle width direction (see FIG. 3).

As shown in FIG. 3, each rear side member 2 is a member having a hat shaped cross section opened upward. The rear side member 2 is joined to a lower surface of the floor panel 10 to form a closed cross section structure extending in the front-rear direction. The rear side member 2 is arranged on the vehicle width direction outer side of the recess portion 6.

The rear cross member 1 (see FIG. 1) is a member having a hat shaped cross section opened upward, like the rear side member 2. The rear cross member 1 is joined to the lower surface of the floor panel 10 to form a closed cross section structure extending in the vehicle width direction. The rear cross member 1 is arranged in front of the recess portion 6.

Each wheel house 3 is a member forming a space in which a tire is housed, and has an arch shape in a side view. Although illustration is omitted, an inner wall of the wheel house 3 is joined to the rear side member 2.

Moreover, the lower structure 100 of the vehicle is configured to include the exhaust member 11 and the cover member 12.

The exhaust member 11 is a member for releasing exhaust gas generated in an internal combustion engine. The exhaust member 11 includes a pipe shaped exhaust pipe 13 and a muffler 14 provided in the middle of the exhaust pipe 13. The muffler 14 is a member that reduces exhaust noise, and is configured to have a larger diameter than the exhaust pipe 13. The exhaust member 11 is arranged below the floor panel 10.

As shown in FIG. 3, the height dimension H1 of a region of the exhaust member 11 on the vehicle width direction outer side is greater than the height dimension H2 of a region of the exhaust member 11 on the vehicle width direction inner side.

The cover member 12 is a member that protects the floor panel 10 from heat of the exhaust member 11. The cover member 12 is provided between the floor panel 10 and the exhaust member 11 (mainly the muffler 14). A portion of the cover member 12 on the vehicle width direction outer side is arranged at a position above a portion of the cover member 12 on the vehicle width direction inner side. As shown in FIG. 3, the portion of the cover member 12 on the vehicle width direction outer side is bent along an upper surface of the exhaust member 11, and has a so-called crank shape. Moreover, the portion of the cover member 12 on the vehicle width direction inner side is bent along a lower surface of the recess portion 6 in the rear floor panel 5, and has a crank shape. These crank shapes improve the flexural rigidity of the cover member 12 in the front-rear direction. Moreover, as shown in FIG. 2, the cover member 12 includes front fixation portions 121 and 122, a bead portion 123, and a rear fixation portion 124.

The front fixation portions 121 and 122 are provided in a front portion of the cover member 12. The front fixation portions 121 and 122 are attached with, for example, screws at positions that are substantially left-right symmetric with respect to the rear side member 2. The front fixation portion 121 on the vehicle width direction inner side is attached to a bottom surface of the rear cross member 1. The front fixation portion 122 on the vehicle width direction inner side is attached to a rear end portion of the wheel house 3.

The rear fixation portion 124 (see FIG. 2) is provided behind the front fixation portions 121 and 122, and is fixed to the rear side member 2 with a screw. The rear fixation portion 124 is provided in a substantially center portion of the cover member 12 in the vehicle width direction. Moreover, the rear fixation portion 124 includes a protruding portion 125 (see FIG. 3), and the protruding portion 125 is formed by bending to protrude toward the rear side member 2.

As shown in FIG. 2, the bead portion 123 is a two-strip protruding portion extending in the vehicle width direction, and has a function of improving the flexural rigidity of the cover member 12 in the vehicle width direction to suppress vibration. The bead portion 123 is arranged behind the front fixation portions 121 and 122. The bead portion 123 is provided at a position overlapping the protruding portion 125. The bead portion 123 is formed by bending to protrude toward the floor panel 10, like the protruding portion 125.

In the cover member 12, since the protruding portion 125 and the bead portion 123 protrude in the same direction, that is toward the floor panel 10, they can be firmly fixed to the floor panel 10. Moreover, a dimple shape is formed on a surface of the cover member 12.

Figure 4:
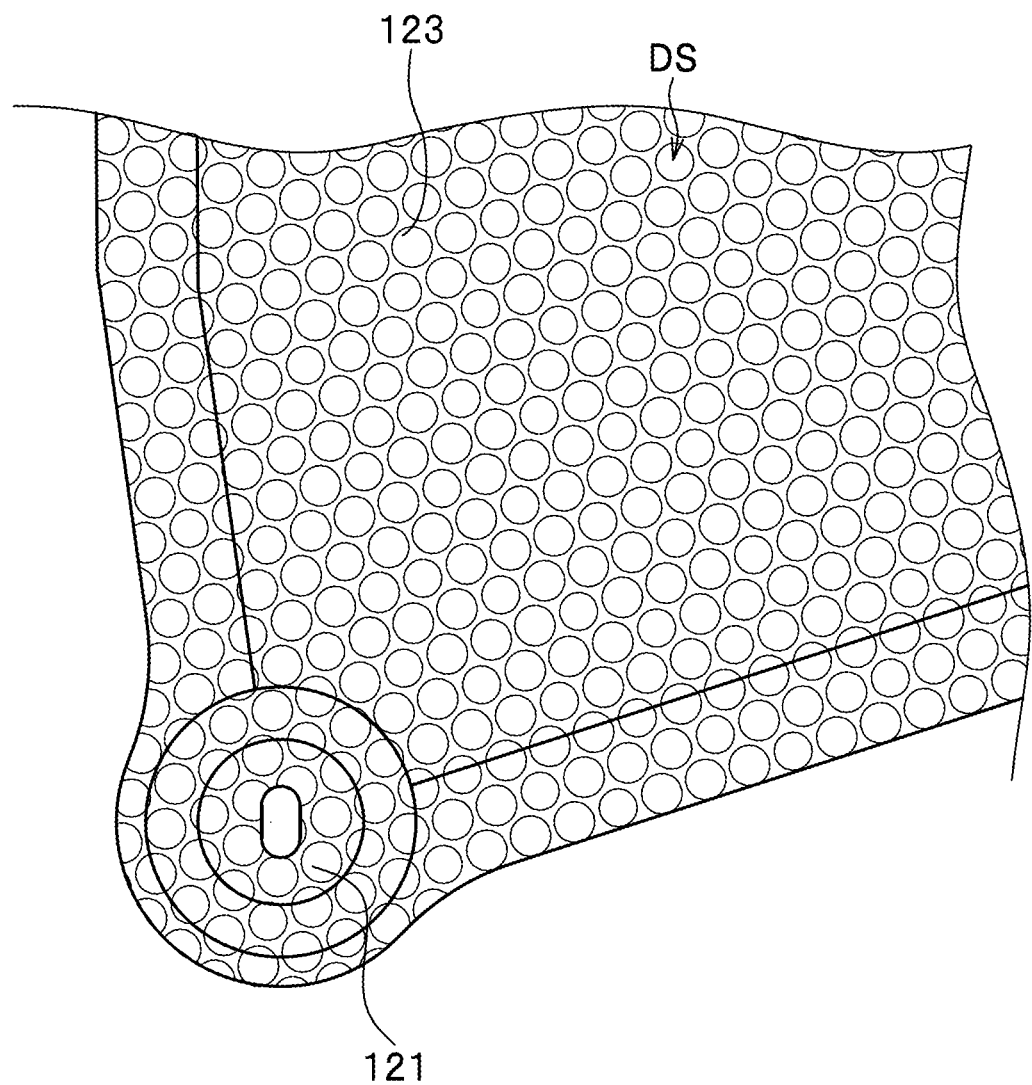
FIG. 4 is an explanatory view showing part of a surface of a cover member.

FIG. 4 is an explanatory view showing part of the surface of the cover member 12.

As shown in FIG. 4, in the cover member 12, a dimple shape DS is formed over the entire region of the cover member 12. Forming the dimple shape DS in the cover member 12 can improve the rigidity of the cover member 12 without increasing the plate thickness of the cover member 12. Note that the dimple shape DS only needs to be formed at least in a region behind the front fixation portions 121 and 122.

The dimple shape DS is formed by performing a press process on a thin metal. In the present embodiment, in the dimple shape DS, fine circular recesses are orderly arranged in a hexagonal close-packed pattern. In the cover member 12, it is only necessary to form a dimple shape and, for example, the shape of the recesses may be a circular shape or a polygonal (for example, hexagonal) shape.

As described above, the lower structure 100 of the vehicle according to the present embodiment is configured to include the vehicle body floor 30, the exhaust member 11 arranged below the vehicle body floor 30, and the cover member 12 provided between the floor panel 10 and the exhaust member 11 and attached to the vehicle body floor 30.

The cover member 12 includes the front fixation portions 121 and 122 provided on the front side and fixed to the floor panel 10 and the bead portion 123 arranged behind the front fixation portions 121 and 122 and extending in the vehicle width direction.

In such a configuration, since the lower structure 100 of the vehicle includes the bead portion 123 behind the fastening points of front fixation portions 121 and 122, it is possible to suppress vibration on the rear end side of the cover member 12 caused by traveling wind and water splashing.

Moreover, in the cover member 12, the dimple shape DS is formed in at least the region behind the front fixation portions 121 and 122.

According to such a configuration, in the lower structure 100 of the vehicle, forming the dimple shape DS in at least a rear portion of the cover member 12 can improve rigidity without increasing the plate thickness.

Moreover, the cover member 12 is configured to further include the rear fixation portion 124 provided behind the front fixation portions 121 and 122 and fixed to the floor panel 10.

The rear fixation portion 124 includes the protruding portion 125 formed by bending to protrude toward the floor panel 10, and the bead portion 123 is provided at a position overlapping the protruding portion 125.

According to such a configuration, in the lower structure 100 of the vehicle, causing the protruding portion 125 to protrude toward the floor panel 10 and overlap the bead portion 123 in a portion of the cover member 12 where the rear fixation portion 124 is provided can improve the rigidity around the rear fixation portion 124. Moreover, causing the protruding portion 125 and the bead portion 123 to overlap each other can further improve the rigidity of the bead portion 123 around the rear fixation portion 124.

FIG. 5 is an explanatory view showing a state where the lower structure of the vehicle in FIG. 3 includes no rear fixation portion, as a modified example.

As shown in FIG. 5, the cover member 12 is fixed to the rear cross member 1 with the front fixation portions 121 and 122. Since the cover member 12 includes the bead portion 123 behind the fastening points of the front fixation portions 121 and 122, vibration on the rear end side of the cover member 12 can be suppressed. Accordingly, even if the rear end side of the bead portion 123 cannot be fixed to the vehicle body floor 30 without provision of a bracket, the rear fixation portion 124 and the bracket can be omitted.

What is claimed is:

1. A lower structure of a vehicle, comprising:
a vehicle body floor, the vehicle body floor including
   a floor panel which forms a floor surface of a vehicle body,
   a pair of left and right rear side members which is provided on a lower surface of the floor panel and extends in a vehicle front-rear direction, and
   a rear cross member which is provided on the lower surface of the floor panel and extends in a vehicle width direction;
an exhaust member arranged below the floor panel; and
a cover member provided between the floor panel and the exhaust member and attached to the vehicle body floor, wherein
the cover member includes
   a plurality of front fixation portions provided on a front side of the cover member and fixed to the vehicle body floor,
   a rear fixation portion which is fixed to the vehicle body floor and is provided at a rear side of the plurality of front fixation portions, and
   a bead portion arranged behind the plurality of front fixation portions and extending in the vehicle width direction, and
at least one of the plurality of front fixation portions and the rear fixation portion are provided overlapped with one of the pair of left and right rear side members and the rear cross member in an up and down direction.

2. The lower structure of a vehicle according to claim 1, wherein, in the cover member, a dimple shape is formed in at least a region behind the plurality of front fixation portions.

3. The lower structure of a vehicle according to claim 1, wherein
the rear fixation portion includes a protruding portion formed by bending to protrude toward the vehicle body floor, and
the bead portion is provided at a position overlapping the protruding portion.

4. The lower structure of a vehicle according to claim 2, wherein
the rear fixation portion includes a protruding portion formed by bending to protrude toward the vehicle body floor, and
the bead portion is provided at a position overlapping the protruding portion.

* * * * *